(12) United States Patent
Saito et al.

(10) Patent No.: US 8,133,410 B2
(45) Date of Patent: *Mar. 13, 2012

(54) LIQUID CRYSTAL COMPOSITION AND LIQUID CRYSTAL DISPLAY DEVICE

(75) Inventors: Masayuki Saito, Chiba (JP); Shigeru Kibe, Chiba (JP)

(73) Assignees: JNC Corporation, Tokyo (JP); Chisso Petrochemical Corporation, Tokyo (JP)

(*) Notice: Subject to any disclaimer, the term of this patent is extended or adjusted under 35 U.S.C. 154(b) by 113 days.

This patent is subject to a terminal disclaimer.

(21) Appl. No.: 12/673,155

(22) PCT Filed: Aug. 20, 2008

(86) PCT No.: PCT/JP2008/064804
§ 371 (c)(1),
(2), (4) Date: Feb. 11, 2010

(87) PCT Pub. No.: WO2009/028367
PCT Pub. Date: Mar. 5, 2009

(65) Prior Publication Data
US 2011/0095228 A1    Apr. 28, 2011

(30) Foreign Application Priority Data

Aug. 27, 2007 (JP) .............................. 2007-219689
Aug. 20, 2008 (WO) .................. PCT/JP2008/064804

(51) Int. Cl.
C09K 19/00 (2006.01)
C09K 19/06 (2006.01)
C09K 19/32 (2006.01)
C09K 19/52 (2006.01)

(52) U.S. Cl. ............ 252/299.66; 252/299.01; 252/299.6; 252/299.61; 252/299.63; 430/20; 428/1.1; 349/1; 349/56; 345/87

(58) Field of Classification Search ............. 252/299.01, 252/299.6, 299.61, 299.63, 299.66, 299.67; 428/1.1; 430/20; 349/1, 56; 345/87
See application file for complete search history.

(56) References Cited

U.S. PATENT DOCUMENTS

| 3,660,505 | A | 5/1972 | Starnes et al. |
| 5,858,270 | A | 1/1999 | Matsui et al. |
| 7,976,913 | B2 * | 7/2011 | Hiraoka et al. ................ 428/1.1 |
| 2003/0213935 | A1 | 11/2003 | Heckmeier et al. |
| 2006/0210724 | A1 | 9/2006 | Heckmeier et al. |
| 2006/0286308 | A1 | 12/2006 | Kirsch et al. |

FOREIGN PATENT DOCUMENTS

| DE | 4006921 | 3/1990 |
| JP | H02-233626 | 9/1990 |
| JP | H04-30382 | 2/1992 |
| JP | H10-251186 | 9/1998 |
| JP | 2001-123170 | 5/2001 |
| JP | 2002-327175 | 11/2002 |
| JP | 2003-176251 | 6/2003 |
| WO | 96-11897 | 4/1996 |
| WO | 2005/019377 | 3/2005 |
| WO | 2006/061094 | 6/2006 |
| WO | 2008/105286 | 9/2008 |

* cited by examiner

Primary Examiner — Geraldina Visconti
(74) Attorney, Agent, or Firm — J.C. Patents

(57) ABSTRACT

The invention is to provide a liquid crystal composition that satisfies at least one characteristic among the characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat, or that is suitably balanced concerning at least two characteristics. The invention is to provide an AM device that has a short response time, a large voltage holding ratio, a large contrast ratio, a long service life and so forth. The invention is to provide a liquid crystal composition having a nematic phase that contains a specific five-membered ring compound having a large optical anisotropy and a large dielectric anisotropy as a first component and a specific compound having a small viscosity as a second component, and a liquid crystal display device containing the composition.

20 Claims, No Drawings

LIQUID CRYSTAL COMPOSITION AND LIQUID CRYSTAL DISPLAY DEVICE

BACKGROUND OF THE INVENTION

1. Field of the Invention

The invention relates mainly to a liquid crystal composition suitable for use in an active matrix (AM) device, and an AM device including the composition. The invention relates especially to a liquid crystal composition having a positive dielectric anisotropy, and to a device having a twisted nematic (TN) mode, an optically compensated bend (OCB) mode, an in-plane switching (IPS) mode or a polymer sustained alignment (PSA) mode including the composition.

2. Related Art

In a liquid crystal display device, a classification based on an operating mode for liquid crystals includes phase change (PS), twisted nematic (TN), super twisted nematic (STN), electrically controlled birefringence (ECB), optically compensated bend (OCB), in-plane switching (IPS), vertical alignment (VA), and polymer sustained alignment (PSA). A classification based on a driving mode in the device includes a passive matrix (PM) and an active matrix (AM). The PM is further classified into static, multiplex and so forth and the AM is further classified into a thin film transistor (TFT), a metal-insulator-metal (MIM) and so forth. The TFT is further classified into amorphous silicon and polycrystal silicon. The latter is classified into a high-temperature type and a low-temperature type according to the production process. A classification based on a light source includes a reflection type utilizing natural light, a transmission type utilizing a backlight, and a semi-transmission type utilizing both natural light and a backlight.

These devices include a liquid crystal composition having suitable characteristics. The liquid crystal composition has a nematic phase. General characteristics of the composition should be improved to give an AM devices having good general characteristics. Table 1 below summarizes the relationship between the general characteristics of the two. The general characteristics of the composition will be further explained based on a commercially available AM device. The temperature range of a nematic phase relates to the temperature range in which the device can be used. A desirable maximum temperature of the nematic phase is 70° C. or more and a desirable minimum temperature is −10° C. or less. The viscosity of the composition relates to the response time of the device. Rotational viscosity also relates to the response time. A short response time is desirable to display moving images on the device. Accordingly, a small viscosity of the composition is desirable. A small viscosity at a low temperature is more desirable.

TABLE 1

General Characteristics of a Liquid Crystal Composition and an AM Device

| No | General Characteristics of a Composition | General Characteristics of an AM Device |
| --- | --- | --- |
| 1 | Temperature range of a nematic phase is wide | Usable temperature range is wide |
| 2 | Viscosity is small[1)] | Response time is short |
| 3 | Optical anisotropy is suitable | Contrast ratio is large |
| 4 | Dielectric anisotropy is positively or negatively large | Driving voltage is low and electric power consumption is small |
| | | Contrast ratio is large |
| 5 | Specific resistance is large | Voltage holding ratio is large and a contrast ratio is large |
| 6 | It is stable to ultraviolet light and heat | Service life is long |

[1)]A liquid crystal composition can be injected into a liquid crystal cell in a shorter period of time.

The optical anisotropy the composition relates to the contrast ratio of the device. The product (Δn·d) of the optical anisotropy (Δn) of the composition and the cell gap (d) of the device is designed in order to maximize the contrast ratio. A suitable value of the product depends on the kind of operating modes. In a device having a TN mode or the like, a suitable value is about 0.45 μm. In this case, a composition having a large optical anisotropy is desirable for a device having a small cell gap. A large dielectric anisotropy of the composition contributes to a low threshold voltage, a small electric power consumption and a large contrast ratio. Accordingly, a large dielectric anisotropy is desirable. A large specific resistance of the composition contributes to a large voltage holding ratio and a large contrast ratio of the device. Accordingly, a composition having a large specific resistance is desirable at a room temperature and also at a high temperature in the initial stage. A composition having a large specific resistance is desirable at room temperature and also at a high temperature after it has been used for a long time. The stability of the composition to ultraviolet light and heat relates to the service life of the liquid crystal display device. In the case where the stability is high, the device has a long service life. These characteristics are desirable for an AM device used in a liquid crystal projector, a liquid crystal television, and so forth.

Conventional compositions are disclosed in the following patent documents No. 1 to No. 6. No. 1: DE 4,006,921 A; No. 2: WO 1996-11897 A; No. 3: JP 2003-176251 A, and No. 4; WO 2005/019,377 A.

A desirable AM device has characteristics such as a wide temperature range usable, a short response time, a large contrast ratio, a low threshold voltage, a large voltage holding ratio and a long service life. Even one millisecond shorter response time is desirable. Thus, the composition having characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat is especially desirable.

DISCLOSURE OF THE INVENTION

Subject to be Solved

One of the purposes of the invention is to provide a liquid crystal composition that satisfies at least one characteristic among the characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat. Another of the purposes is to provide a liquid crystal composition that is suitably balanced concerning at least two characteristics. Another of the purposes of the invention is to provide a liquid crystal display device that contains the composition. Another of the purposes of the invention is to provide a composition that has a large optical anisotropy, a large dielectric anisotropy, a high stability to ultraviolet light and so forth, and to provide an AM device that has a short response time, a large voltage holding ratio, a large contrast ratio, a long service life and so forth.

Method to be Solved

The invention concerns a liquid crystal composition having a nematic phase that includes at least one compound selected from the group of compounds represented by formulas (1) as a first component, and at least one compound selected from the group of compounds represented by formula (2) as a second component:

liquid crystal display panel and a liquid crystal display module. The "liquid crystal compound" is a generic term for a compound having a liquid crystal phase such as a nematic phase and a smectic phase, and also for a compound having no liquid crystal phase but being useful as a component of a composition. The useful compound has a six-membered ring such as 1,4-cyclohexylene and 1,4-phenylene, and its molecular structure is rod-like. An optically active compound or a polymerizable compound may occasionally be added to the composition. Even in the case where the compound is a liquid crystal compound, the compound is classified into an additive herein. At least compound selected from the group of compounds represented by formula (1) may occasionally be

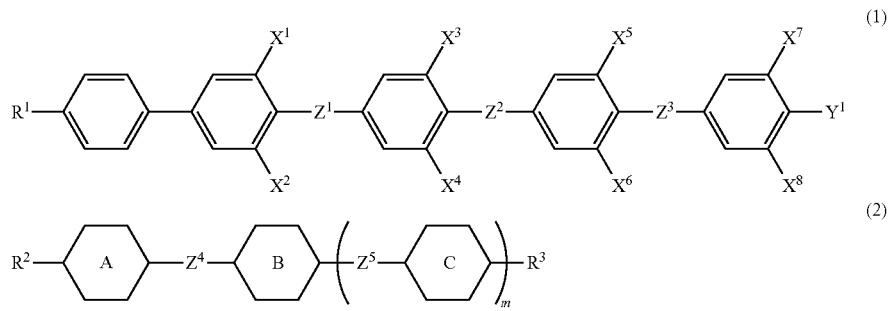

wherein $R^1$ is alkyl having 1 to 12 carbons, alkoxy having 1 to 12 carbons or alkenyl having 2 to 12 carbons; $R^2$ and $R^3$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A, ring B and ring C are each independently 1,4-cyclohexylene, 1,4-phenylene, 2-fluoro-1,4-phenylene, 3-fluoro-1,4-phenylene or 2,5-difluoro-1,4-phenylene; $Z^1$, $Z^2$ and $Z^3$ are each independently a single bond, ethylene, carbonyloxy or difluoromethyleneoxy, and at least one of $Z^1$, $Z^2$ and $Z^3$ is difluoromethyleneoxy; $Z^4$ and $Z^5$ are each independently a single bond, ethylene or carbonyloxy; $X^1$, $X^2$, $X^3$, $X^4$, $X^5$, $X^6$, $X^7$ and $X^8$ are each independently hydrogen or fluorine; $Y^1$ is fluorine, chlorine or trifluoromethoxy; and m is 0 or 1.

Effect of the Invention

One of the advantages of the invention is to provide a liquid crystal composition that satisfies at least one characteristic among the characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat. Another of the advantages of the invention is to provide a liquid crystal composition that is suitably balanced concerning at least two characteristics. Another of the advantages of the invention is to provide a liquid crystal display device that contains the composition. Another of the advantages of the invention is to provide a composition that has a large optical anisotropy, a large dielectric anisotropy, a high stability to ultraviolet light and so forth, and to provide an AM device that has a short response time, a large voltage holding ratio, a large contrast ratio, a long service life and so forth.

The terms used in the specification and claims are defined as follows. The liquid crystal composition and the liquid crystal display device of the invention may occasionally be abbreviated to "the composition" and "the device," respectively. A liquid crystal display device is a generic term for a abbreviated to "the compound (1)" "The compound (1)" means one compound, or two or more compounds represented by formula (1) The same rules apply to compounds represented by the other formulas. The term "arbitrary" indicates that both the position and the number are arbitrary, excluding the case where the number is 0.

A higher limit of a temperature range of a nematic phase may occasionally be abbreviated to "a maximum temperature." A lower limit of the temperature range of a nematic phase may occasionally be abbreviated to "a minimum temperature." That "a specific resistance is large" means that a composition has a large specific resistance at room temperature and also at a high temperature in the initial stage, and that the composition has a large specific resistance at room temperature and also at high temperature even after it has been used for a long time. That "a voltage holding ratio is large" means that a device has a large voltage holding ratio at room temperature and also at a high temperature in the initial stage, and that the device has a large voltage holding ratio at room temperature and also at a high temperature even after it has been used for a long time. In the description of the characteristics such as the optical anisotropy, measured values obtained by the methods disclosed in examples are used. A first component means one compound, or two or more compounds. "A ratio of the first component" means the percentage by weight (% by weight) based on the total weight of a liquid crystal composition. The same rule applies to the ratio of a second component and so forth. A ratio of an additive mixed into the composition means the percentage by weight (% by weight) based on the total weight of the liquid crystal composition.

The symbol $R^1$ was used for a plurality of compounds in the chemical formulas for component compounds. In these compounds, two arbitrary $R^1$ may be the same or different. In one case, for example, $R^1$ of the compound (1) is ethyl and $R^1$ of the compound (3) is ethyl. In another case, $R^1$ of the compound (1) is ethyl and $R^1$ of the compound (3) is propyl. The same rule applies to $R^2$, $R^3$ and so forth. "CL" in the chemical formulas represents chlorine.

The invention includes the following items.
1. A liquid crystal composition having a nematic phase that includes at least one compound selected from the group of compounds represented by formulas (1) as a first component and at least one compound selected from the group of compounds represented by formula (2) as a second component:

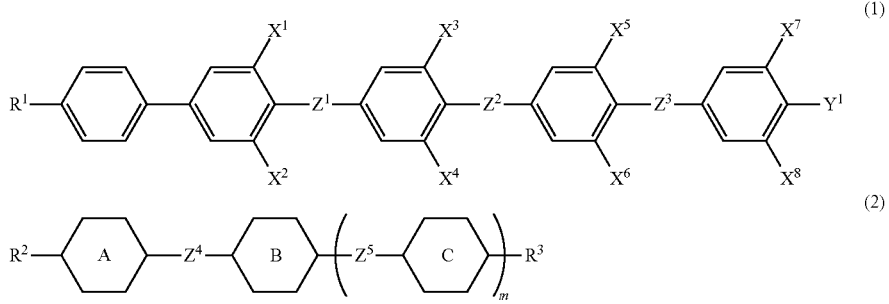

wherein $R^1$ is alkyl having 1 to 12 carbons, alkoxy having 1 to 12 carbons or alkenyl having 2 to 12 carbons; $R^2$ and $R^3$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A, ring B and ring C are each independently 1,4-cyclohexylene, 1,4-phenylene, 2-fluoro-1,4-phenylene, 3-fluoro-1,4-phenylene or 2,5-difluoro-1,4-phenylene; $Z^1$, $Z^2$ and $Z^3$ are each independently a single bond, ethylene, carbonyloxy or difluoromethyleneoxy, wherein at least one of $Z^1$, $Z^2$ and $Z^3$ is difluoromethyleneoxy; $Z^4$ and $Z^5$ are each independently a single bond, ethylene or carbonyloxy; $X^1$, $X^2$, $X^3$, $X^4$, $X^5$, $X^6$, $X^7$ and $X^8$ are each independently hydrogen or fluorine; $Y^1$ is fluorine, chlorine or trifluoromethoxy; and m is 0 or 1.

2. The liquid crystal composition according to item 1, wherein the first component is at least one compound selected from the group of compounds represented by formulas (1-1) to (1-3):

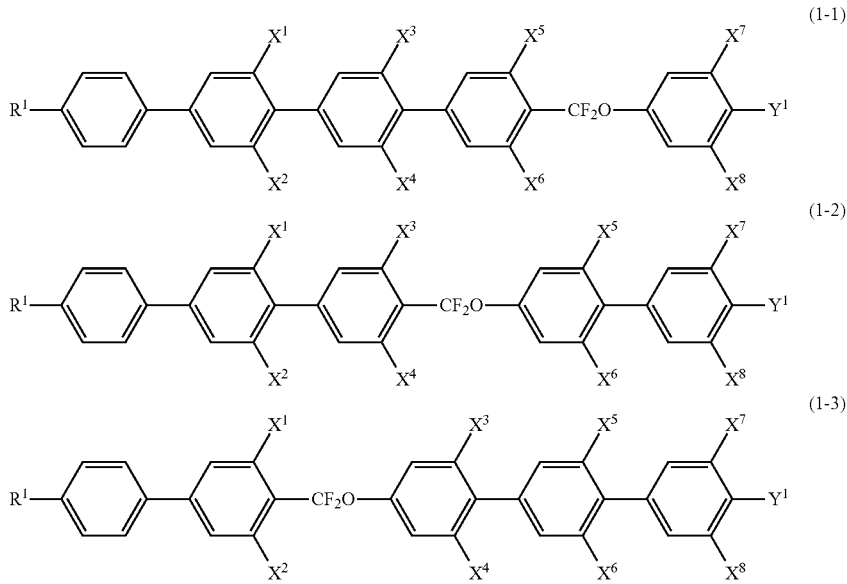

wherein $R^1$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$ and $X^8$ are each independently hydrogen or fluorine; and $Y^1$ is fluorine, chlorine or trifluoromethoxy.

3. The liquid crystal composition according to item 2, wherein the first component is at least one compound selected from the group of compounds represented by formula (1-1).

4. The liquid crystal composition according to any one of items 1 to 3, wherein the second component is at least one compound selected from the group of compounds represented by formulas (2-1) to (2-6):

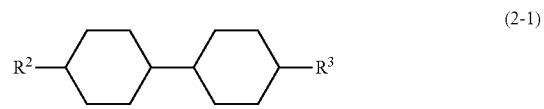

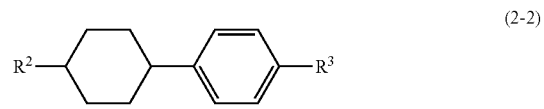

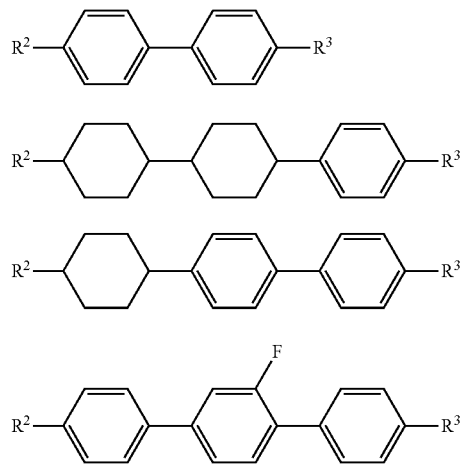

(2-3)
(2-4)
(2-5)
(2-6)

wherein $R^2$ and $R^3$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine.

5. The liquid crystal composition according to item 4, wherein the second component is at least one compound selected from the group of compounds represented by formula (2-1).

6. The liquid crystal composition according to item 4, wherein the second component is at least one compound selected from the group of compounds represented by formula (2-6).

7. The liquid crystal composition according to item 4, wherein the second component is a mixture of at least one compound selected from the group of compounds represented by formula (2-1), and at least one compound selected from the group of compounds represented by formula (2-4).

8. The liquid crystal composition according to item 4, wherein the second component is a mixture of at least one compound selected from the group of compounds represented by formula (2-1), and at least one compound selected from the group of compounds represented by formula (2-6).

9. The liquid crystal composition according to item 4, wherein the second component is a mixture of at least one compound selected from the group of compounds represented by formula (2-1), at least one compound selected from the group of compounds represented by formula (2-4), and at least one compound selected from the group of compounds represented by formula (2-6).

10. The liquid crystal composition according to any one of items 1 to 9, wherein the ratio of the first component is in the range of 5% to 30% by weight, and the ratio of the second component is in the range of 35% to 80% by weight, based on the total weight of the liquid crystal composition.

11. The liquid crystal composition according to any one of items 1 to 10 that further includes at least one compound selected from the group of compounds represented by formula (3) as a third component:

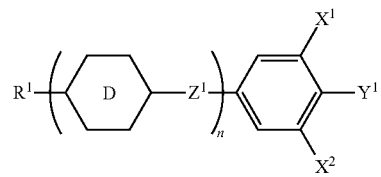

(3)

wherein $R^1$ is alkyl having 1 to 12 carbons, alkoxy having 1 to 12 carbons or alkenyl having 2 to 12 carbons; ring D is independently 1,4-cyclohexylene, 1,3-dioxane-2,5-diyl, 1,4-phenylene, 3-fluoro-1,4-phenylene, 3,5-difluoro-1,4-phenylene or 2,5-pyrimidine; $Z^1$ is a single bond, ethylene, carbonyloxy or difluoromethyleneoxy; $X^1$ and $X^2$ are each independently hydrogen or fluorine; $Y^1$ is fluorine, chlorine or trifluoromethoxy; and n is 1, 2 or 3.

12. The liquid crystal composition according to item 11, wherein the third component is at least one compound selected from the group of compounds represented by formulas (3-1) to (3-17):

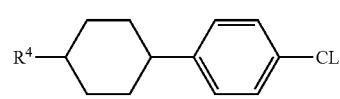

(3-1)

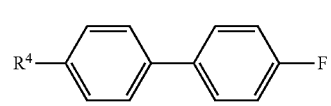

(3-2)

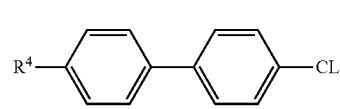

(3-3)

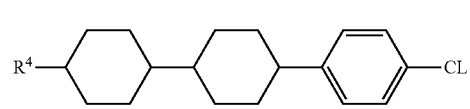

(3-4)

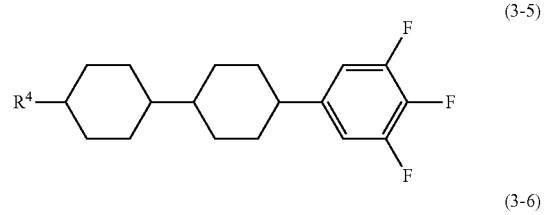

(3-5)

(3-6)

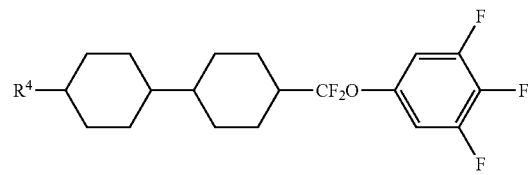

(3-7)

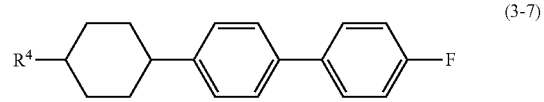

(3-8)

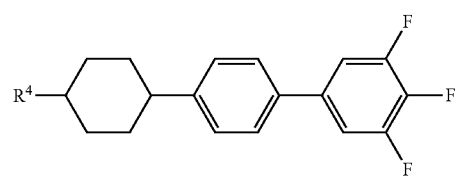

(3-9) 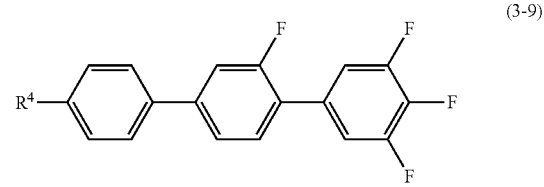

(3-10) 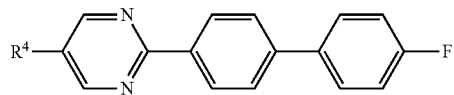

(3-11) 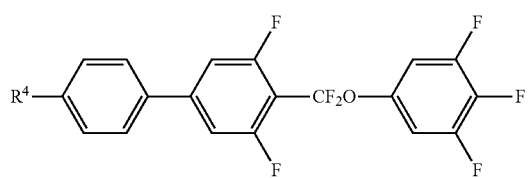

(3-12) 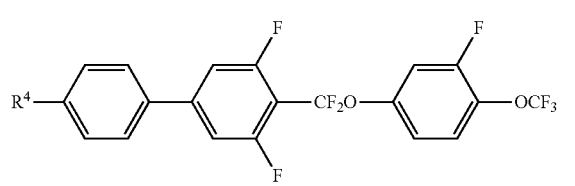

(3-13) 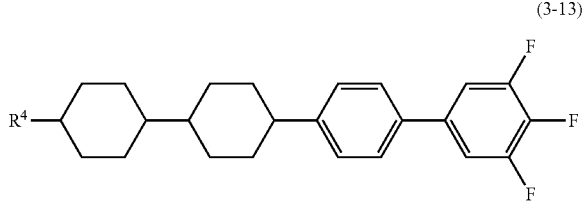

(3-14) 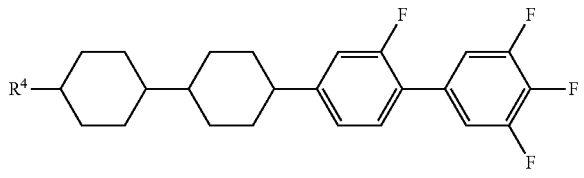

(3-15) 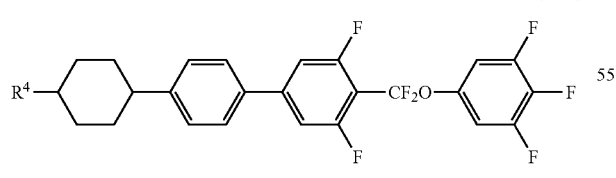

(3-16) 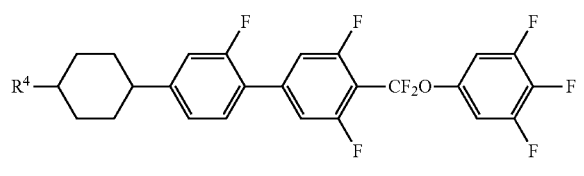

(3-17) 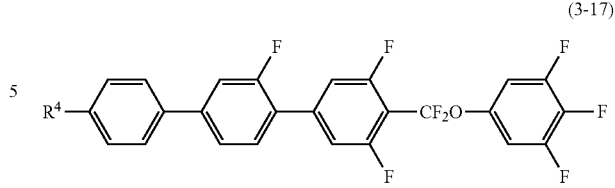

wherein $R^4$ is alkyl having 1 to 12 carbons or alkenyl having 2 to 12 carbons.

13. The liquid crystal composition according to item 12, wherein the third component is at least one compound selected from the group of compounds represented by formula (3-9).

14. The liquid crystal composition according to item 12, wherein the third component is at least one compound selected from the group of compounds represented by formula (3-10).

15. The liquid crystal composition according to item 12, wherein the third component is at least one compound selected from the group of compounds represented by formula (3-11).

16. The liquid crystal composition according to item 12, wherein the third component is at least one compound selected from the group of compounds represented by formula (3-17).

17. The liquid crystal composition according to item 12, wherein the third component is a mixture of at least one compound selected from the group of compounds represented by formula (3-6), and at least one compound selected from the group of compounds represented by formula (3-11).

18. The liquid crystal composition according to item 12, wherein the third component is a mixture of at least one compound selected from the group of compounds represented by formula (3-9), and at least one compound selected from the group of compounds represented by formula (3-11).

19. The liquid crystal composition according to item 12, wherein the third component is a mixture of at least one compound selected from the group of compounds represented by formula (3-11), and at least one compound selected from the group of compounds represented by formula (3-17).

20. The liquid crystal composition according to any one of items 11 to 19, wherein the ratio of the third component is in the range of 5% to 50% by weight based on the total weight of the liquid composition.

21. The liquid crystal composition according to any one of items 1 to 20, wherein the composition has a maximum temperature of a nematic phase of 70° C. or more, an optical anisotropy (25° C.) of 0.08 or more at a wavelength of 589 nm, and a dielectric anisotropy (25° C.) of 2 or more at a frequency of 1 kHz.

22. A liquid crystal display device that includes the liquid crystal composition according to any one of items 1 to 21.

23. A liquid crystal display device according to item 22, wherein an operating mode of the liquid crystal display device is a TN mode, an OCB mode or an IPS mode, and a driving mode of the liquid crystal display device is an active matrix mode.

24. A liquid crystal display device according to item 22, wherein an operating mode of the liquid crystal display device is a PSA mode and a driving mode of the liquid crystal display device is an active matrix mode.

The invention further includes the following: (1) the composition described above that further includes an optically active compound; (2) the composition described above further includes an additive, such as an antioxidant, an ultraviolet light absorbent and/or an antifoaming agent; (3) an AM device including the composition described above; (4) a device having a TN, ECB, OCB, IPS or PSA mode that includes the composition described above; (5) a device having a transmission type that includes the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, main characteristics of the component compounds and main effects of the compounds on the composition will be explained. Third, combinations of components in the composition, desirable ratios of the component compounds and the basis thereof will be explained. Fourth, a desirable embodiment of the component compounds will be explained. Fifth, examples of the component compounds will be shown. Sixth, additives that may be mixed into the composition will be explained. Seventh, methods for preparing the component compounds will be explained. Last, use of the composition will be explained.

First, the constitution of component compounds in the composition will be explained. The composition of the invention is classified into the composition A and the composition B. The composition A may further contain other liquid crystal compounds, an additive, an impurity and so forth. "The other liquid crystal compounds" are different from the compound (1), the compound (2) and the compound (3). Such compounds are mixed into the composition for the purpose of further adjusting characteristics of the composition. Of the other liquid crystal compounds, a smaller amount of a cyano compound is more desirable in view of its stability to heat or ultraviolet light. A more desirable ratio of the cyano compound is 0% by weight. The additive includes an optically active compound, an antioxidant, an ultraviolet light absorbent, a coloring mater, an antifoaming agent, a polymerizable compound and a polymerization initiator. The impurity is a compound and so forth contaminated in the process such as the synthesis of thecomponent compounds. Even in the case where the compound is a liquid crystal compound, it is classified as an impurity herein.

The composition B is essentially consisting of compounds selected from the compound (1), the compound (2) and the compound (3). The term "essentially" means that the composition may contain an additive and an impurity, but does not contain a liquid crystal compound which is different from these compounds. The composition B has a small number of components in comparison with the compound A. The composition B is preferable to the composition A in view of cost reduction. The composition A is preferable to the composition B in view of the fact that characteristics can be further adjusted by mixing the other liquid crystal compounds.

Second, main characteristics of the component compounds and main effects of the compounds on the composition will be explained. The main characteristics of the component compounds are summarized in Table 2 on the basis of effects of the invention. In Table 2, the symbol L represents large or high, the symbol M represents a middle degree, and the symbol S represents small or low. The symbols L, M and S are classifications based on a qualitative comparison among the component compounds.

TABLE 2

| Characteristics of Compounds | | | |
|---|---|---|---|
| Compounds | (1) | (2) | (3) |
| Maximum Temperature | M | S-L | S-M |
| Viscosity | L | S-M | M-L |
| Optical Anisotropy | L | S-L | M-L |
| Dielectric Anisotropy | M-L | 0 | S-L |
| Specific Resistance | L | L | L |

Main effects of the component compounds on the characteristics of the composition upon mixing the component compounds with the composition are as follows. The compound (1) increases the optical anisotropy and increases the dielectric anisotropy. The compound (2) increases the maximum temperature or decreases the viscosity. The compound (3) decreases the minimum temperature and increases the dielectric anisotropy.

Third, combinations of the components in the composition, desirable ratios of the component compounds and the basis thereof will be explained. The combinations of the components in the composition are the first and second components and the first, second and third components.

A desirable ratio of the first component is 5% by weight or more for increasing the optical anisotropy and increasing the dielectric anisotropy, and is 30% by weight or less for decreasing the minimum temperature. A more desirable ratio is in the rage from 5% to 25% by weight. An especially desirable ratio is in the range of 5% to 20% by weight.

A desirable ratio of the second component is 35% by weight or more for decreasing the viscosity, and is 80% by weight or less for increasing the dielectric anisotropy. A more desirable ratio is in the range of 40% to 75% by weight. An especially desirable ratio is in the range 45% to 75% by weight.

The third component is suitable for preparing a composition having an especially large dielectric anisotropy. A desirable ratio of the component is in the range of 5% to 50% by weight. A more desirable ratio is in the range of 10% to 45% by weight. An especially desirable ratio is in the range of 10% to 40% by weight.

Fourth, a desirable embodiment of the component compounds will be explained. $R^1$ is alkyl having 1 to 12 carbons, alkoxy having 1 to 12 carbons or alkenyl having 2 to 12 carbons. A desirable $R^1$ is alkyl having 1 to 12 carbons for increasing the stability to ultraviolet light or heat. $R^2$ and $R^3$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine. A desirable $R^2$ is alkenyl having 2 to 12 carbons for decreasing the minimum temperature or decreasing the viscosity. A desirable $R^3$ is alkyl having 1 to 12 carbons for increasing the stability to ultraviolet light or heat. $R^4$ is alkyl having 1 to 12 carbons or alkenyl having 2 to 12 carbons. A desirable $R^4$ is alkyl having 1 to 12 carbons for increasing the stability to ultraviolet light or heat.

A desirable alkyl is methyl, ethyl, propyl, butyl, pentyl, hexyl, heptyl or octyl. A more desirable alkyl is ethyl, propyl, butyl, pentyl or heptyl for decreasing the viscosity.

A desirable alkoxy is methoxy, ethoxy, propoxy, butoxy, pentyloxy, hexyloxy or heptyloxy. A more desirable alkoxy is methoxy or ethoxy for decreasing the viscosity.

A desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. A more desirable alkenyl is vinyl, 1-propenyl, 3-butenyl or 3-pentenyl for decreasing the viscosity. A desirable configuration of —CH═CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity and for something. Cis is preferable in the alkenyl such as 2-butenyl, 2-pentenyl and 2-hexenyl. In the alkenyl, a straight-chain alkenyl is preferable to a branched chain alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

Ring A, ring B and ring C are each independently 1,4-cyclohexylene, 1,4-phenylene, 2-fluoro-1,4-phenylene, 3-fluoro-1,4-phenylene or 2,5-difluoro-1,4-phenylene. A desirable ring A, ring B or ring C is 1,4-cyclohexylene for decreasing the viscosity or 1,4-phenylene for increasing the optical anisotropy. Ring D is 1,4-cyclohexylene, 1,3-dioxane-2,5-diyl, 1,4-phenylene, 3-fluoro-1,4-phenylene, 3,5-difluoro-1,4-phenylene or 2,5-pyrimidine, and arbitrary two ring D may be the same or different when n is 2 or 3. A desirable ring D is 1,4-phenylene for increasing the optical anisotropy.

$Z^1$, $Z^2$ and $Z^3$ are each independently a single bond, ethylene, carbonyloxy or difluoromethyleneoxy, and arbitrary two $Z^1$ may be the same or different when n is 2 or 3. A desirable $Z^1$, $Z^2$ or $Z^3$ is difluoromethyleneoxy for increasing the dielectric anisotropy. $Z^4$ and $Z^5$ are each independently a single bond, ethylene or carbonyloxy, and two $Z^5$ may be the same or different when m is 2. A desirable $Z^4$ or $Z^5$ is a single bond for decreasing the viscosity.

$X^1$, $X^2$, $X^3$, $X^4$, $X^5$, $X^6$, $X^7$ and $X^8$ are each independently hydrogen or fluorine. Five or more of $X^1$, $X^2$, $X^3$, $X^4$, $X^5$, $X^6$, $X^7$ and $X^8$ are desirably fluorine for increasing the dielectric anisotropy.

$Y^1$ is fluorine, chlorine or trifluoromethoxy. A desirable $Y^1$ is fluorine for decreasing the minimum temperature.

m is 0 or 1. A desirable m is 0 for decreasing the viscosity.

n is 1, 2 or 3. A desirable n is 2 for decreasing for the minimum temperature.

Fifth, examples of the component compounds will be shown. In the desirable compounds described below, $R^5$ is a straight-chain alkyl having 1 to 12 carbons. $R^6$ is a straight-chain alkyl having 1 to 12 carbons or a straight-chain alkoxy having 1 to 12 carbons. $R^7$ and $R^8$ are each independently a straight-chain alkyl having 1 to 12 carbons or a straight-chain alkenyl having 2 to 12 carbons. On the configuration of 1,4-cyclohexylene, trans is preferable to cis for increasing the maximum temperature.

Desirable compound (1) are the compound (1-1-1) to the compound (1-1-3), the compound (1-2-1) to the compound (1-2-2) and the compound (1-3-1). More desirable compound (1) are the compound (1-1-1), the compound (1-2-1) and the compound (1-2-2) Especially desirable compound (1) are the compound (1-1-1) and the compound (1-2-1). Desirable compound (2) are the compound (2-1-1) to the compound (2-6-1). More desirable compound (2) are the compound (2-1-1), the compound (2-3-1), the compound (2-4-1) and the compound (2-6-1). Especially desirable compound (2) are the compound (2-1-1), (2-4-1) and the compound (2-6-1). Desirable compound (3) are the compound (3-1-1) to the compound (3-17-1) and the compound (3-18) to the compound (3-23). More desirable compound (3) are the compound (3-9-1), the compound (3-11-1), the compound (3-15-1) and the compound (3-17-1). Especially desirable compound (3) are the compound (3-11-1) and the compound (3-17-1).

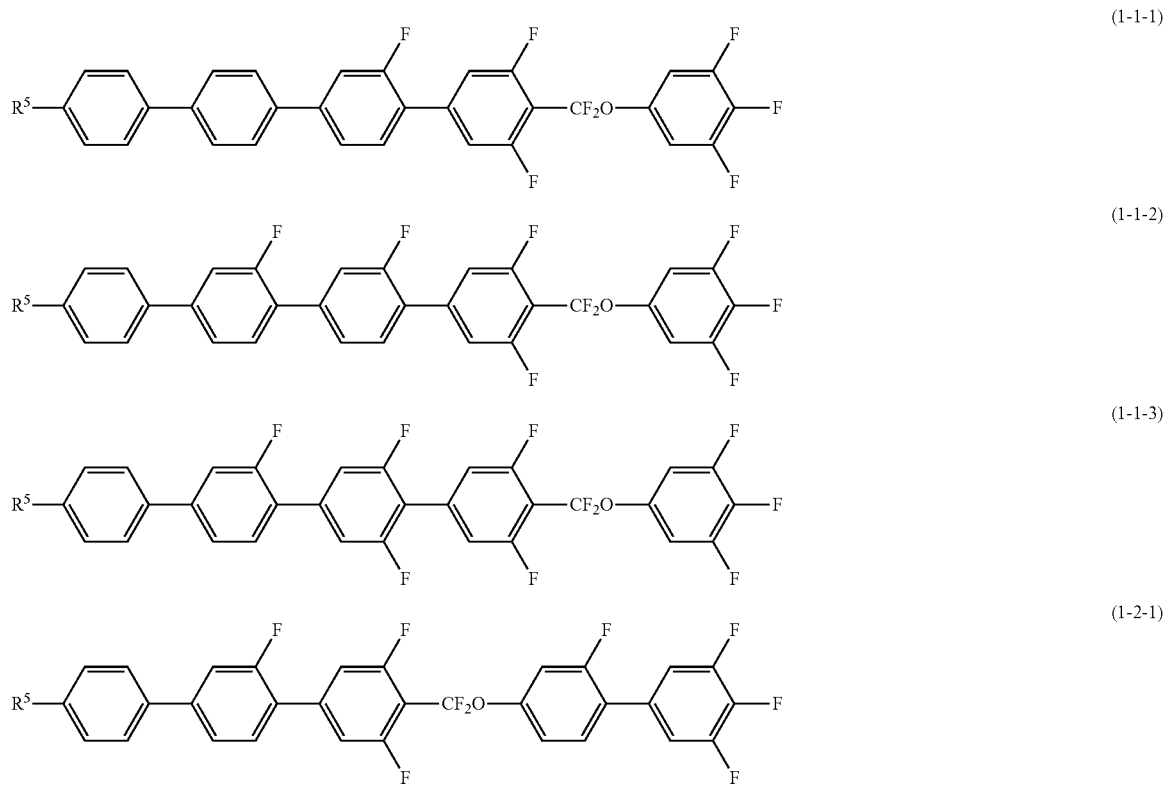

-continued
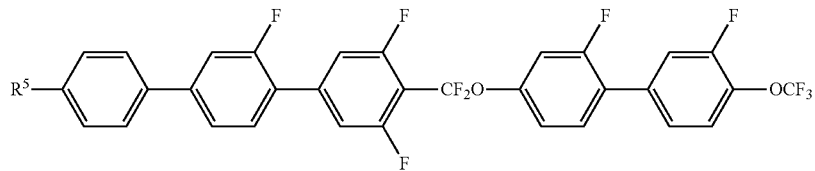 (1-2-2)
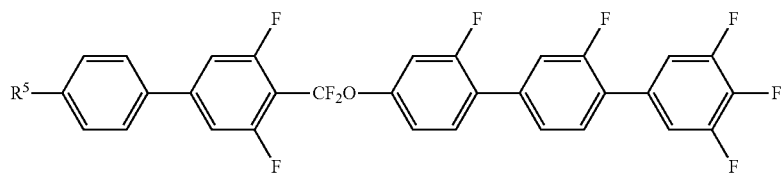 (1-3-1)
 (2-1-1)
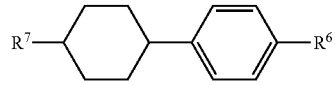 (2-2-1)
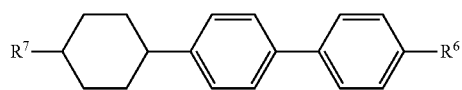 (2-3-1)
 (2-4-1)
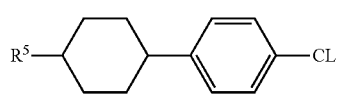 (2-5-1)
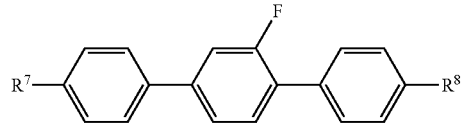 (2-6-1)
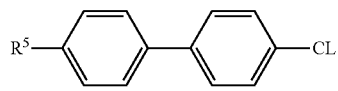 (3-1-1)
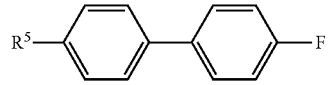 (3-2-1)
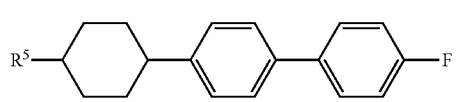 (3-3-1)
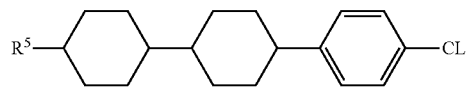 (3-4-1)
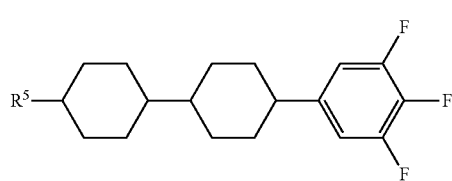 (3-5-1)
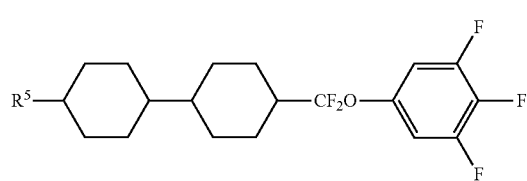 (3-6-1)
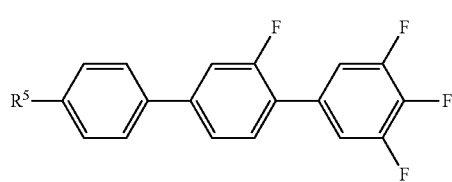 (3-7-1)
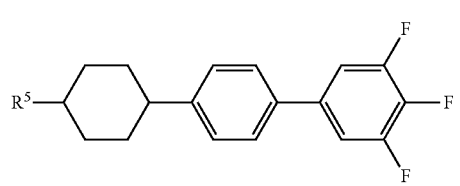 (3-8-1)
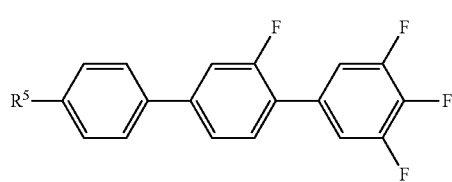 (3-9-1)
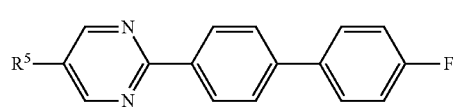 (3-10-1)

-continued (3-11-1)
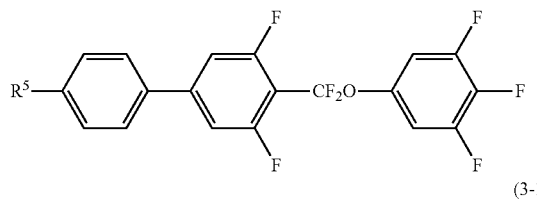

(3-12-1)
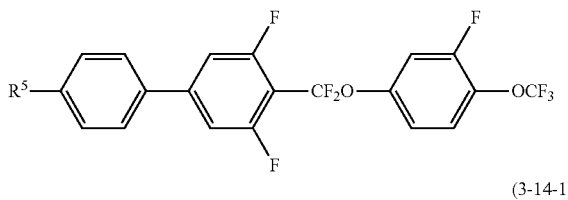

(3-13-1)
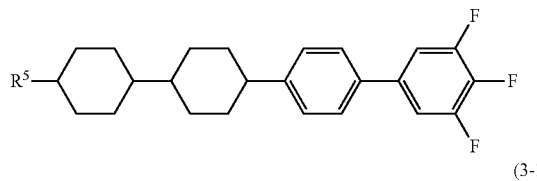

(3-14-1)
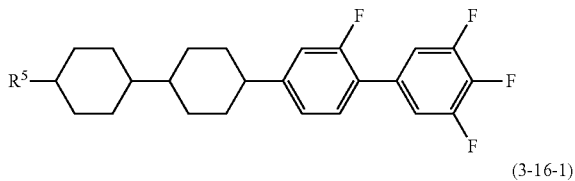

(3-15-1)
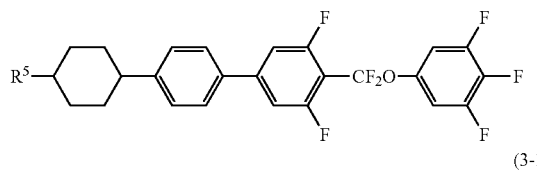

(3-16-1)
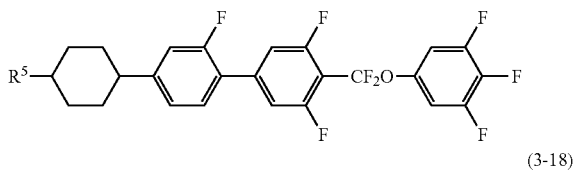

(3-17-1)
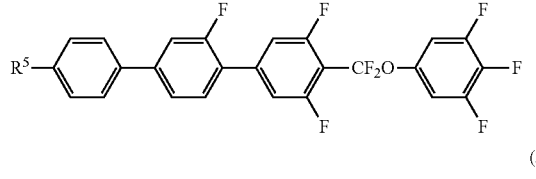

(3-18)
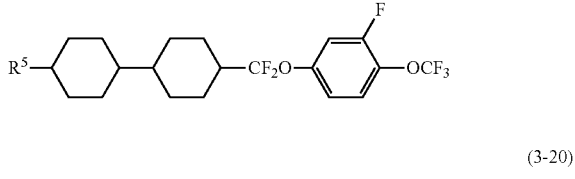

(3-19)
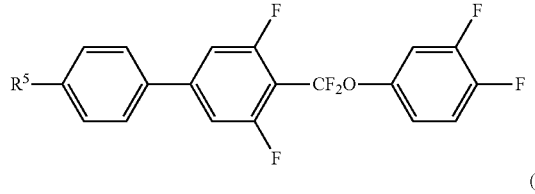

(3-20)
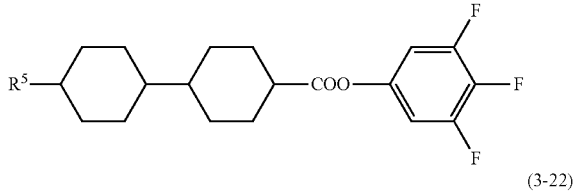

(3-21)
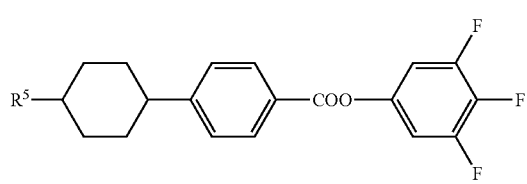

(3-22)
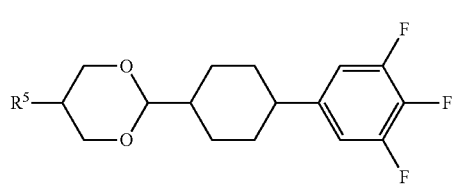

(3-23)
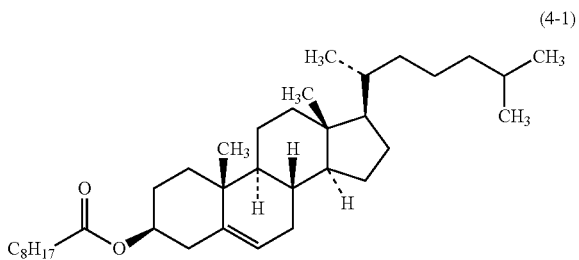

Sixth, additives which may be mixed into the composition will be explained. The additives include an optically active compound, an antioxidant, an ultraviolet light absorbent, a coloring matter, an antifoaming agent, a polymerizable compound, and a polymerization initiator. The optically active compound is mixed into the composition for the purpose of inducing a helical structure and giving a twist angle in liquid crystals. Examples of the compound include the compounds (4-1) to the compound (4-4) bellow. A desirable ratio of the optically active compound is 5% by weight or less. A more desirable ratio is in the range of 0.01% to 2% by weight.

(4-1)

(4-2)

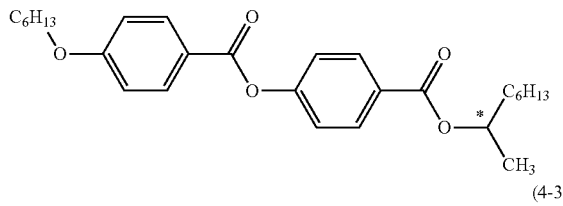

(4-3)

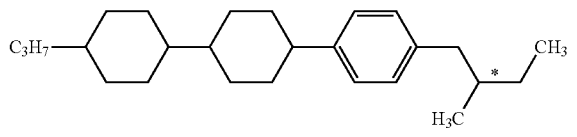

(4-4)

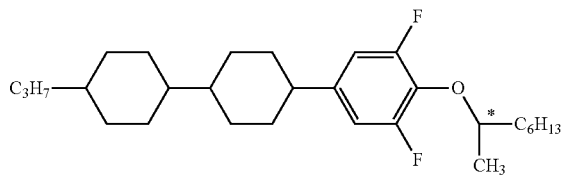

An antioxidant is mixed into the composition in order to avoid a decrease in specific resistance caused by heating in the air, or to maintain a large voltage holding ratio at room temperature and also at a high temperature even after the device has been used for a long time.

(5)

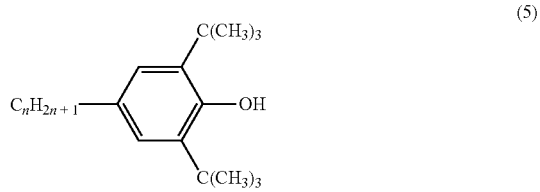

Desirable examples of the antioxidant include the compound (5) wherein n is an integer of from 1 to 9. In the compound (5), a desirable n is 1, 3, 5, 7 or 9. A more desirable n is 1 or 7. The compound (5), wherein n is 1, is effective in preventing a decrease of the specific resistance caused by heating in the air, because it has a large volatility. The compound (5), wherein n is 7, is effective in maintaining a large voltage holding ratio at room temperature and also at a high temperature even after the device has been used for a long time, because is has a small volatility. A desirable ratio of the antioxidant is 50 ppm or more for achieving its effect, and is 600 ppm or less for avoiding a decrease of the maximum temperature or avoiding an increase of the minimum temperature. A more desirable ratio is in the range of 100 ppm to 300 ppm.

Desirable examples of the ultraviolet light absorbent include a benzophenone derivative, a benzoate derivative and a triazole derivative. A light stabilizer such as an amine having steric hindrance is also desirable. A desirable ratio of the absorbent or the stabilizer is 50 ppm or more for achieving its effect and is 10,000 ppm or less for avoiding a decrease of the maximum temperature or avoiding an increase of the minimum temperature. A more desirable ratio is in the range of 100 ppm to 10,000 ppm.

A dichroic dye such as an azo dye or an anthraquinone dye is mixed into the composition for adjusting to a device having a guest host (GH) mode. A desirable ratio of the coloring matter is in the range of 0.01% to 10% by weight. An antifoaming agent such as dimethyl silicone oil or methyl phenyl silicone oil is mixed into the composition for preventing foam formation. A desirable ratio of the antifoaming agent is 1 ppm or more for achieving its effect, and is 1,000 ppm or less for avoiding a poor display. A more desirable ratio is in the range of 1 ppm to 500 ppm.

A polymerizable compound is mixed into the composition for adjusting to a device having a polymer sustained alignment (PSA) mode. Desirable examples of the polymerizable compound include compounds having a polymerizable group, such as acrylates, methacrylates, vinyl compounds, vinyloxy compounds, propenyl ethers and epoxy compounds. Especially desirable examples are acrylate derivatives or methacrylate derivatives. A desirable ratio of the polymerizable compound is 0.05% by weight or more for achieving its effect, and is 10% by weight or less for avoiding a poor display. A more desirable ratio is in the range of 0.1% to 2% by weight. The polymerizable compound is preferably polymerized on irradiation with ultraviolet light or the like in the presence of a suitable initiator such as a photopolymerization initiator. Suitable conditions for polymerization, suitable types of the initiator and suitable amounts are known to a person skilled in the art, and are described in the literature. For example, Irgacure 651 (registered trademark), Irgacure 184 (registered trademark) or Darocure 1173 (registered trademark) (Ciba Japan K.K.), which is a photopolymerization initiator, is suitable for radical polymerization. The polymerizable compound contains a photo-polymerization initiator preferably in the rage of 0.1% to 5% by weight, and most preferably in the range of 1% to 3% by weight.

Seventh, methods for preparing the component compounds will be explained. These compounds can be prepared by known methods. The synthetic methods will be exemplified as follows. The compounds (1-2-1), (3-11-1) and (3-17-1) are synthesized by the method described in JP H10-251186 A (1998). The compounds (3-5-1) and (3-8-1) are synthesized by the method described in JP H2-233626 A (1990). The compounds (2-1-1) and (2-4-1) are synthesized by the method described in JP H4-30382 B (1992). Antioxidants are commercially available. The compound of formula (5), wherein n is 1, is available from Sigma-Aldrich Corporation. The compound (5), wherein n is 7, and so forth are synthesized according to the method described in U.S. Pat. No. 3,660,505 (1972).

The compounds that synthetic methods were not described above can be synthesized according to the methods described in books such as ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), and NEW EXPERIMENTAL CHEMISTRY COURSE (Shin Jikken Kagaku Kouza) (Maruzen, Inc.). The composition is prepared according to known methods using the compounds thus obtained. For example, the component compounds are mixed, and dissolved in each other by heating.

Last, use of the composition will be explained. Most of the compositions have a minimum temperature of −10° C. or less, a maximum temperature of 70° C. or more and an optical anisotropy in the range of 0.07 to 0.20. The device containing the composition has a large voltage holding ratio. The composition is suitable for an AM device. The composition is suitable especially for an AM device having a transmission type. The composition having an optical anisotropy in the range of 0.08 to 0.25 and also the composition having an optical anisotropy in the range of 0.10 to 0.30 may be prepared by controlling ratios of the component compounds or by mixing with other liquid crystal compounds. The composition can be used as a composition having a nematic phase and as an optically active composition by adding an optically active compound.

The composition can be used for an AM device. It can also be used for a PM device. The composition can also be used for an AM device and a PM device having a mode such as PC, TN, STN, ECB, OCB, IPS, VA or PSA. It is especially desirable to use the composition for the AM device having the TN, OCB or IPS mode. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for a nematic curvilinear aligned phase (NCAP) device prepared by microencapsulating the composition, and for a polymer dispersed (PD) device in which a three-dimensional net-work polymer is formed in the composition.

EXAMPLES

When a sample was a composition, it was measured as it was, and the value obtained was described here. When a sample was a compound, a sample for measurement was prepared by mixing 15% by weight of the compound and 85% by weight of mother liquid crystals. Characteristic values of the compound was calculated from values obtained by measurement, according to a method of extrapolation. That is: (extrapolated value)=(measured value−0.85×(measured value of mother liquid crystals)/0.15. When a smectic phase (or crystals) separated out at this ratio at 25° C., the ratio of the compound to mother liquid crystals was changed step by step in the order of (10% by weight/90% by weight), (5% by weight/95% by weight) and (1% by weight/99% by weight). Values of the maximum temperature, the optical anisotropy, viscosity and the dielectric anisotropy with regard to the compound were obtained by the extrapolation.

The components of the mother liquid crystals were as follows. The ratios of the components were expressed as percent by weight.

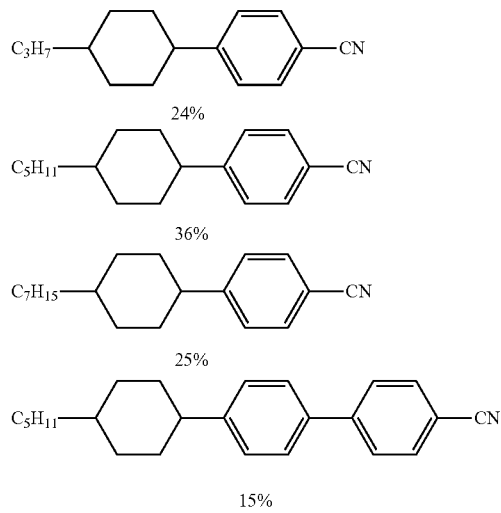

Characteristics were measured according to the following methods. Most methods are described in the Standard of Electronic Industries Association of Japan, EIAJ-ED-2521A or those with some modifications.

Maximum Temperature of a Nematic Phase (NI; ° C.): A sample was placed on a hot plate in a melting point apparatus equipped with a polarizing microscope, and was heated at the rate of 1° C. per minute. Temperature was measured when part of the sample began to change from a nematic phase to an isotropic liquid. A higher limit of a temperature range of a nematic phase may occasionally be abbreviated to "a maximum temperature."

Minimum Temperature of a Nematic Phase ($T_C$; ° C.): A sample having a nematic phase was put in glass vials, and then kept in freezers at temperatures of 0° C., −10° C., −20° C., −30° C. and −40° C. for ten days, and the liquid crystal phases were observed. For example, when the sample remained in a nematic phase at −20° C. and changed to crystals or a smectic phase at −30° C., $T_C$ was expressed as $\leq$−20° C. A lower limit of a temperature range of a nematic phase may occasionally be abbreviated to "a minimum temperature."

Viscosity ($\eta$; measured at 20° C.; mPa·s): Viscosity was measured by use of an E-type viscometer.

Rotational Viscosity ($\gamma 1$; measured at 25° C.; mPa·s): Rotational viscosity was measured according to the method disclosed in M. Imai, et al., *Molecular Crystal and Liquid Crystals*, Vol. 259, P. 37 (1995). A sample was put in a device, in which a twist angle was 0 degrees and the cell gap between two glass substrates was 5 μm. The device was impressed stepwise with 0.5 V increments in the range of 16 V to 19.5 V. After a period of 0.2 second without impressed voltage, impressed voltage was repeated under the conditions of only one rectangular wave (rectangular pulse of 0.2 second) and the absence of voltage (2 seconds). A peak current and a peak time of a transient current generated by the impressed voltage were measured. The rotational viscosity was obtained from the measured values and the calculating equation (8) in the article presented by M. Imai, et al., p. 40. The value of dielectric anisotropy necessary for the calculation was obtained according to the method described below by use of the device which had been used for measurement of the rotational viscosity.

Optical Anisotropy ($\Delta n$; measured at 25° C.): Measurement was carried out by use of an Abbe refractometer with a polarizing plate mounted on the ocular, on irradiation with light at a wavelength of 589 nm. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. A value of optical anisotropy was calculated from the equation: $\Delta n = n\| - n\bot$.

Dielectric Anisotropy ($\Delta \epsilon$; measured at 25° C.): A sample having a nematic phase was put in a TN device in which the distance between two glass substrates (cell gap) is 9 μm and the twist angle is 80 degrees. Sine waves (10 V, 1 kHz) were impressed onto the device, and a dielectric constant ($\epsilon\|$) in a major axis direction of liquid crystal molecules was measured after 2 seconds. Sine waves (0.5 V, 1 kHz) were impressed onto the device and a dielectric constant ($\epsilon\bot$) in a minor axis direction of liquid crystal molecules was measured after 2 seconds. A value of the dielectric anisotropy was calculated from the equation:

$$\Delta \epsilon = \epsilon\| - \epsilon\bot.$$

Threshold Voltage (Vth; measured at 25° C.; V): Measurement was carried out with a brightness photometer, an LCD evaluation system Model LCD-5100 made by Otsuka Electronics Co., Ltd. The light source was a halogen lamp. A sample was poured into a TN device having a normally white mode, in which the distance between two glass substrates (cell gap) was about 0.45/Δn (μm) and the twist angle was 80 degrees. Voltage to be impressed onto the device (32 Hz, rectangular waves) was stepwise increased in 0.02 V increments from 0 V up to 10 V. During the increase, the device was irradiated with light in the perpendicular direction, and the amount of light passing through the device was measured. A voltage-transmission curve was prepared, in which the maximum amount of light corresponded to 100% transmittance and the minimum amount of light corresponded to 0% transmittance. The threshold voltage was voltage at 90% transmittance.

Voltage Holding Ratio (VHR-1; measured at 25° C.; %): A TN device used for measurement had a polyimide-alignment film and the distance between two glass substrates (cell gap) was 5 μm. A sample was poured into the device, and then the device was sealed with an adhesive polymerizable on irradiation with ultraviolet light. The TN device was impressed and charged with pulse voltage (60 microseconds at 5 V). A decreasing voltage was measured for 16.7 milliseconds with a high-speed voltmeter, and the area A between a voltage curve and a horizontal axis in a unit cycle was obtained. The area B was an area without the decrease. The voltage holding ratio was a percentage of the area A to the area B.

Voltage Holding Ratio (VHR-2; measured at 80° C.; %): A TN device used for measurement had a polyimide-alignment film, and the distance between two glass substrates (cell gap) was 5 μm. A sample was poured into the device, and then the device was sealed with an adhesive polymerizable on irradiation with ultraviolet light. The TN device was impressed and charged with pulse voltage (60 microseconds at 5 V). A decreasing voltage was measured for 16.7 milliseconds with a high-speed voltmeter and the area A between a voltage curve and a horizontal axis in a unit cycle was obtained. The area B was an area without the decrease. The voltage holding ratio is a percentage of the area A to the area B.

Voltage Holding Ratio (VHR-3; measured at 25° C.; %): A voltage holding ratio was measured after irradiation with ultraviolet light, evaluating stability to ultraviolet light. A composition having a large VHR-3 has a large stability to ultraviolet light. A TN device used for measurement had a polyimide-alignment film and the cell gap was 5 μm. A sample was poured into the device, and then the device was irradiated with light for 20 minutes. The light source was a super-high pressure mercury lamp USH-500D (made by Ushio, Inc.), and the distance between the device and the light source was 20 cm. In measurement of VHR-3, a decreasing voltage was measured for 16.7 milliseconds. The VHR-3 is preferably 90% or more, and more preferably 95% or more.

Voltage Holding Ratio (VHR-4; measured at 25° C.; %): A TN device into which a sample was poured was heated in a constant-temperature chamber at 80° C. for 500 hours, and then the voltage holding ratio was measured, evaluating stability to heat. A composition having a large VHR-4 has a large stability to heat. In measurement of VHR-4, a decreasing voltage was measured for 16.7 milliseconds.

Response Time (τ; measured at 25° C.; millisecond): Measurement was carried out with a brightness photometer, an LCD evaluation system Model LCD-5100 made by Otsuka Electronics Co., Ltd. The light source was a halogen lamp. The low-pass filter was set at 5 kHz. A sample was poured into a TN device having a normally white mode, in which the distance between two glass substrates (cell gap) was 5.0 μm and the twist angle was 80 degrees. Rectangular waves (60 Hz, 5 V, 0.5 second) were impressed to the device. The device was simultaneously irradiated with light in the perpendicular direction, and the amount of light passing through the device was measured. The maximum amount of light corresponded to 100% transmittance, and the minimum amount of light corresponded to 0% transmittance. Rise time (τr; millisecond) was the period of time required for a change in transmittance from 90% to 10%. Fall time (τf; millisecond) is the period of time required for a change in transmittance from 10% to 90%. The response time is the sum of the rise time and the fall time thus obtained.

Specific Resistance (ρ; measured at 25° C.; Ωcm): A sample of 1.0 ml was poured into a vessel equipped with electrodes. The vessel was impressed with DC voltage (10 V) and the DC current was measured after 10 seconds. The specific resistance was calculated according to the following equation. (specific resistance)=[(voltage)×(electric capacitance of vessel)]/(DC current)×(dielectric constant in a vacuum)].

Gas Chromatographic Analysis: A gas chromatograph Model GC-14B made by Shimadzu Corporation was used for measurement. The carrier gas was helium (2 ml per minute). The evaporator and the detector (FID) were set up at 280° C. and 300° C., respectively. A capillary column DB-1 (length 30 m, bore 0.32 mm, film thickness 0.25 μm; dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was prepared in an acetone solution (0.1% by weight), and 1 μl of the solution was injected into the evaporator. A recorder used was a Model C-R5A Chromatopac Integrator made by Shimadzu Corporation or its equivalent. A gas chromatogram obtained showed the retention time of peaks and the peak areas corresponding to the component compounds.

Solvents for diluting the sample may also be chloroform, hexane and so forth. The following capillary column may also be used in order to separate the component compounds: HP-1 made by Agilent Technologies, Inc. (length 30 m, bore 0.32 mm, film thickness 0.25 μm), Rtx-1 made by Restek Corporation (length 30 m, bore 0.32 mm, film thickness 0.25 μm), and BP-1 made by SGE International Pty. Ltd. (length 30 m, bore 0.32 mm, film thickness 0.25 μm). A capillary column CBP1-M50-025 (length 50 m, bore 0.25 mm, film thickness 0.25 μm) made by Shimadzu Corporation may also be used for the purpose of avoiding an overlap of peaks of the compounds.

The ratio of liquid crystal compounds included in the composition may be calculated by the following method. The liquid crystal compounds can be detected by use of a gas chromatograph. The area ratio of peaks in the gas chromatogram corresponds to the ratio (in moles) of liquid crystal compounds. When the capillary columns described above are used, the correction coefficient of respective liquid crystal compounds may be regarded as one. Accordingly, the ratio (percent by weight) of the liquid crystal compounds can be calculated from the area ratio of peaks.

The invention will be explained in detail by way of Examples. The invention is not limited by Examples described below. The compounds described in Comparative Examples and Examples are expressed as symbols according to the definition in the following Table 3. In Table 3, the configuration of 1,4-cyclohexylene is trans. A parenthesized number next to the symbolized compound in Examples corresponds to a desirable compound's number. The symbol (−) means other liquid crystal compounds. Ratios (percentage) of liquid crystal compounds mean the percentage by weight (% by weight) based on the total weight of the liquid crystal composition, and the liquid crystal composition further includes an impurity. Last, characteristics of the composition are summarized.

TABLE 3

Method of Description of Compound using Symbols
R—(A$_1$)—Z$_1$— - - —Z$_n$—(A$_n$)—R'

| 1) Left Terminal Group R— | Symbol |
|---|---|
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |

| 2) Right Terminal Group —R' | Symbol |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —CH=CF$_2$ | —VFF |
| —F | —F |
| —Cl | —CL |
| —OCF$_3$ | —OCF3 |

| 3) Bonding Group —Z$_n$— | Symbol |
|---|---|
| —C$_2$H$_4$— | 2 |
| —COO— | E |
| —CH=CH— | V |
| —C≡C— | T |
| —CF$_2$O— | X |

| 4) Ring Structure —A$_n$— | Symbol |
|---|---|
|  | H |
|  | B |
| 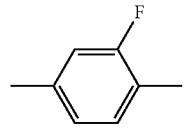 | B(F) |
| 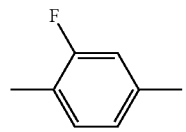 | B(2F) |
| 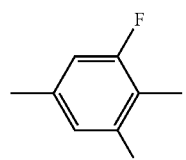 | B(F, F) |

TABLE 3-continued

Method of Description of Compound using Symbols
R—(A$_1$)—Z$_1$— - - —Z$_n$—(A$_n$)—R'

| | |
|---|---|
| 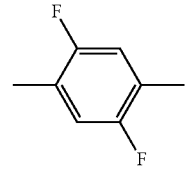 | B(2F, 5F) |
| 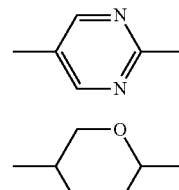 | Py |
| 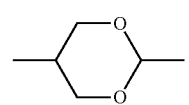 | G |

5) Example of Description

Example 1. V2-BB(F)B-1

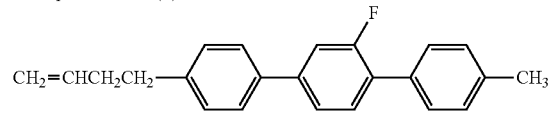

Example 2. 3-HB-CL

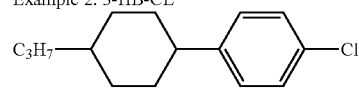

Example 3. 3-HHB-1

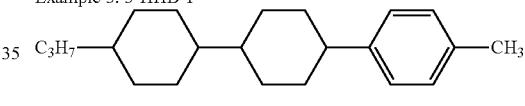

Example 4. 3-BB(F,F)XB(F)-CF3

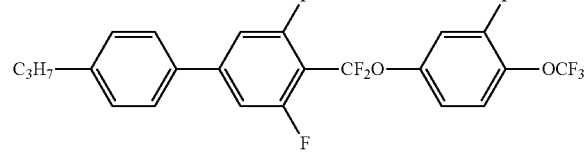

Comparative Example 1

Example 39 was selected from compositions disclosed in WO 1966-011897 A. The basis for the selection was because the composition contained the compound (3), and had the smallest rotational viscosity. The components and the characteristics of the composition were as follows. Because there was no description therein about the rotational viscosity, the composition was prepared and its rotational viscosity was measured according to the method described above.

| | | |
|---|---|---|
| 3-HBXB(F,F)-F | (3) | 3% |
| 5-HBXB(F,F)-F | (3) | 8% |
| 3-HBXB-OCF3 | (3) | 5% |
| 2-HBB(F)-F | (3) | 8% |
| 3-HBB(F)-F | (3) | 8% |
| 5-HBB(F)-F | (3) | 16% |
| 5-HB-F | (3) | 6% |
| 7-HB-F | (3) | 6% |

-continued

| | | |
|---|---|---|
| 5-HHB-OCF3 | (3) | 8% |
| 3-H2HB-OCF3 | (3) | 8% |
| 5-H2HB-OCF3 | (3) | 8% |
| 3-HH2B-OCF3 | (3) | 8% |
| 5-HH2B-OCF3 | (3) | 8% |

NI = 84.9° C.; Δn = 0.101; Δε = 5.5; Vth = 2.12 V; η = 16.6 mPa·s; γ1 = 110 mPa·s.

Comparative Example 2

Example 4 was selected from compositions disclosed in JP 2003-176251 A. The basis for the selection was because the composition contained the compounds (3-5-1), (3-6-1) and (3-9-1), and had the smallest rotational viscosity. The components and the characteristics of the composition were as follows. Because there was no description therein about the rotational viscosity at 25° C., the composition was prepared and its rotational viscosity was measured according to the method described above.

| | | |
|---|---|---|
| 2-HHB(F,F)-F | (3-5-1) | 12% |
| 3-HHB(F,F)-F | (3-5-1) | 10% |
| 2-HHB-OCF3 | (3) | 8% |
| 3-HHB-OCF3 | (3) | 8% |
| 4-HHB-OCF3 | (3) | 7% |
| 5-HHB-OCF3 | (3) | 4% |
| 2-HB(F)B(F,F)-F | (3) | 12% |
| 3-HB(F)B(F,F)-F | (3) | 4% |
| 2-HHXB(F,F)-F | (3-6-1) | 12% |
| 2-BB(F)B(F,F)-F | (3-9-1) | 8% |
| V-HHXB(F,F)-F | (3-6) | 15% |

NI = 75.0° C.; Δn = 0.093; Vth = 1.17 V; γ1 = 115 mPa·s.

Example 1

It was found that the composition in Example 1 had a smaller rotational viscosity than that of Comparative Example 1.

| | | |
|---|---|---|
| 5-BB(F)B(F,F)XB(F)B(F,F)-F | (1-2-1) | 5% |
| V-HH-3 | (2-1-1) | 36% |
| 1V-HH-3 | (2-1-1) | 11% |
| V-HHB-1 | (2-4-1) | 11% |
| V2-HHB-1 | (2-4-1) | 3% |
| 2-BB(F)B-3 | (2-6-1) | 9% |
| 2-BB(F)B-5 | (2-6-1) | 3% |
| 3-HBB(F,F)-F | (3-8-1) | 6% |
| 3-BB(F,F)XB(F,F)-F | (3-11-1) | 16% |

NI = 75.1° C.; Tc ≦ −20° C.; Δn = 0.108; Δε = 4.5; Vth = 1.98 V; γ1 = 46.0 mPa·s; τ = 9.0 ms; VHR-1 = 99.1%; VHR-2 = 98.1%; VHR-3 = 98.1%.

Example 2

It was found that the composition in Example 2 had a smaller rotational viscosity than that of Comparative Example 2.

| | | |
|---|---|---|
| 5-BB(F)B(F,F)XB(F)B(F,F)-F | (1-2-1) | 4% |
| 5-BB(F)B(F,F)XB(F)B(F)-OCF3 | (1-2-2) | 6% |
| V-HH-3 | (2-1-1) | 45% |
| 1V-HH-3 | (2-1-1) | 11% |
| V-HHB-3 | (2-4-1) | 4% |
| 1-BB(F)B-2V | (2-6-1) | 6% |
| 2-BB(F)B-2V | (2-6-1) | 4% |
| 3-HBB(F,F)-F | (3-8-1) | 5% |
| 3-BB(F)B(F,F)-F | (3-9-1) | 10% |
| 3-BB(F,F)XB(F,F)-OCF3 | (3-12-1) | 5% |

NI = 76.6° C.; Tc ≦ −20° C.; Δn = 0.114; Δε = 4.4; Vth = 2.02 V; γ1 = 41.5 mPa·s; τ = 8.5 ms; VHR-1 = 99.2%; VHR-2 = 98.2%; VHR-3 = 98.1%.

Example 3

It was found that the composition in Example 3 had a smaller rotational viscosity than that of Comparative Example 1.

| | | |
|---|---|---|
| 5-BB(F)B(F)B(F,F)XB(F)-F | (1-1) | 6% |
| 5-BB(F)B(F,F)B(F,F)XB(F,F)-F | (1-1-3) | 3% |
| 5-BB(F,F)XB(F)B(F)B(F,F)-F | (1-3-1) | 3% |
| 2-HH-3 | (2-1-1) | 5% |
| 3-HH-4 | (2-1-1) | 10% |
| V-HH-3 | (2-1-1) | 25% |
| V2-BB-1 | (2-3-1) | 7% |
| V-HHB-1 | (2-4-1) | 7% |
| 1V-HBB-2 | (2-5-1) | 3% |
| 3-BB(F)B-5 | (2-6-1) | 7% |
| 3-HB-CL | (3-1-1) | 6% |
| 3-HHB-CL | (3-4-1) | 4% |
| 3-HHXB(F,F)-F | (3-6-1) | 4% |
| 3-BB(F,F)XB(F,F)-F | (3-11-1) | 10% |

NI = 76.7° C.; Tc ≦ −20° C.; Δn = 0.114; Δε = 5.4; Vth = 1.92 V; γ1 = 52.2 mPa·s; τ = 9.3 ms; VHR-1 = 99.2%; VHR-2 = 98.3%; VHR-3 = 98.2%.

Example 4

It was found that the composition in Example 4 had a smaller rotational viscosity than that of Comparative Example 2.

| | | |
|---|---|---|
| 5-BBB(F)B(F,F)XB(F,F)-F | (1-1-1) | 3% |
| 5-BB(F)B(F)B(F,F)XB(F,F)-F | (1-1-2) | 3% |
| V-HH-3 | (2-1-1) | 35% |
| 1V-HH-3 | (2-1-1) | 8% |
| 2-BB(F)B-3 | (2-6-1) | 6% |
| V2-BB(F)B-1 | (2-6-1) | 5% |
| V2-BB(F)B-2 | (2-6-1) | 5% |
| V2-BB(F)B-3 | (2-6-1) | 6% |
| 1V2-BB-F | (3-2-1) | 3% |
| 1V2-BB-CL | (3-3-1) | 3% |
| 3-HBB-F | (3-7-1) | 5% |
| 3-BB(F,F)XB(F,F)-F | (3-11-1) | 10% |
| 5-HHBB(F,F)-F | (3-13-1) | 3% |
| 3-BB(F,F)XB(F)-F | (3-19) | 5% |

NI = 77.7° C.; Tc ≦ −20° C.; Δn = 0.135; Δε = 4.6; Vth = 1.96 V; γ1 = 51.3 mPa·s; τ = 9.2 ms; VHR-1 = 99.2%; VHR-2 = 98.2%; VHR-3 = 98.2%.

Example 5

| | | |
|---|---|---|
| 5-BB(F)B(F,F)XB(F)B(F,F)-F | (1-2-1) | 9% |
| 5-BB(F)B(F,F)XB(F)B(F)-OCF3 | (1-2-2) | 6% |
| V-HH-3 | (2-1-1) | 45% |
| 1V-HH-3 | (2-1-1) | 8% |
| 7-HB-1 | (2-2-1) | 3% |
| 3-HB-O2 | (2-2-1) | 4% |
| 1V2-BB-1 | (2-3-1) | 6% |
| 3-BB(F)B-2V | (2-6-1) | 4% |
| 3-PyBB-F | (3-10-1) | 5% |
| 4-PyBB-F | (3-10-1) | 5% |
| 5-PyBB-F | (3-10-1) | 5% |

NI = 84.5° C.; Tc ≦ −20° C.; Δn = 0.124; Δε = 4.6; Vth = 1.98 V; γ1 = 40.9 mPa·s; τ = 8.4 ms; VHR-1 = 98.9%; VHR-2 = 97.9%; VHR-3 = 97.9%.

Example 6

| | | |
|---|---|---|
| 5-BB(F)B(F,F)XB(F)B(F,F)-F | (1-2-1) | 7% |
| 5-BB(F)B(F,F)XB(F)B(F)-OCF3 | (1-2-2) | 3% |
| 3-HH-VFF | (2-1) | 15% |
| V-HH-3 | (2-1-1) | 30% |
| V-HH-5 | (2-1-1) | 10% |
| V2-BB-1 | (2-3-1) | 5% |
| 3-HBB-2 | (2-5-1) | 3% |
| 1-BB(F)B-2V | (2-6-1) | 7% |
| 3-HHB(F,F)-F | (3-5-1) | 4% |
| 3-HHB(F)B(F,F)-F | (3-14-1) | 3% |
| 3-HBB(F,F)XB(F,F)-F | (3-15-1) | 7% |
| 3-HB(F)B(F,F)XB(F,F)-F | (3-16-1) | 6% |

NI = 82.0° C.; Tc ≦ −20° C.; Δn = 0.111; Δε = 5.5; Vth = 1.92 V; γ1 = 48.7 mPa·s; τ = 9.1 ms; VHR-1 = 99.2%; VHR-2 = 98.3%; VHR-3 = 98.2%.

Example 7

| | | |
|---|---|---|
| 5-BB(F)B(F) B(F,F)XB(F)-F | (1-1) | 3% |
| 5-BB(F)B(F,F)XB(F)B(F,F)-F | (1-2-1) | 4% |
| V-HH-3 | (2-1-1) | 40% |
| 1V-HH-3 | (2-1-1) | 11% |
| V-HHB-1 | (2-4-1) | 13% |
| V2-HHB-1 | (2-4-1) | 5% |
| 3-BB(F,F)XB(F,F)-F | (3-11-1) | 10% |
| 3-HHEB(F,F)-F | (3-20) | 7% |
| 3-HBEB(F,F)-F | (3-21) | 3% |
| 4-BB(F)B(F,F)XB(F,F)-F | (3-17-1) | 4% |

NI = 83.6° C.; Tc ≦ −20° C.; Δn = 0.094; Δε = 4.8; Vth = 1.97 V; γ1 = 52.6 mPa·s; τ = 9.3 ms; VHR-1 = 99.1%; VHR-2 = 98.1%; VHR-3 = 98.2%.

Example 8

| | | |
|---|---|---|
| 5-BB(F)B(F)B(F,F)XB(F,F)-F | (1-1-2) | 3% |
| 5-BB(F)B(F,F)XB(F)B(F,F)-F | (1-2-1) | 5% |
| V-HH-3 | (2-1-1) | 49% |
| V2-BB-1 | (2-3-1) | 6% |
| 3-HHB-1 | (2-4-1) | 5% |
| 1-BB(F)B-2V | (2-6-1) | 5% |
| 2-BB(F)B-2V | (2-6-1) | 5% |
| 3-HHXB(F)-OCF3 | (3-18) | 6% |
| 3-HGB(F,F)-F | (3-22) | 4% |
| 5-GHB(F,F)-F | (3-23) | 4% |
| 4-BB(F)B(F,F)XB(F,F)-F | (3-17-1) | 5% |
| 1O1-HH-5 | (—) | 3% |

NI = 78.9° C.; Tc ≦ −20° C.; Δn = 0.106; Δε = 4.2; Vth = 2.04 V; γ1 = 43.1 mPa·s; τ = 8.8 ms; VHR-1 = 99.1%; VHR-2 = 98.1%; VHR-3 = 98.2%.

Industrial Applicability

The invention relates mainly to a liquid crystal composition suitable for an active matrix (AM) device and so forth, which can be usable for an AM device and so forth. The liquid crystal composition is usable for a device having a twisted nematic (TN) mode, an optically compensated bend (OCB) mode, an in-plane switching (IPS) mode or a polymer sustained alignment (PSA) mode, because the dielectric anisotropy is positive.

What is claimed is:

1. A liquid crystal composition having a nematic phase that comprises at least one compound selected from the group of compounds represented by formulas (1) as a first component and at least one compound selected from the group of compounds represented by formula (2) as a second component:

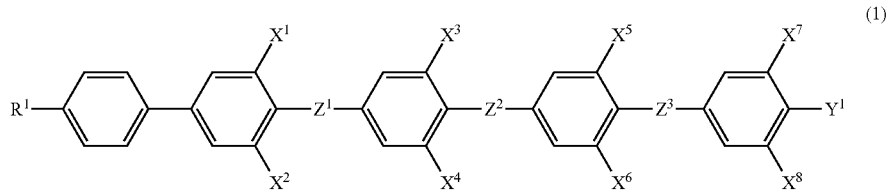

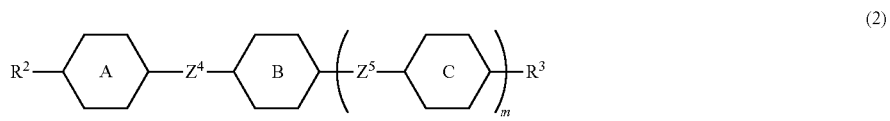

wherein R¹ is alkyl having 1 to 12 carbons, alkoxy having 1 to 12 carbons or alkenyl having 2 to 12 carbons; R² and R³ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A, ring B and ring C are each independently 1,4-cyclohexylene, 1,4-phenylene, 2-fluoro-1,4-phenylene, 3-fluoro-1,4-phenylene or 2,5-difluoro-1,4-phenylene; $Z^1$, $Z^2$ and $Z^3$ are each independently a single bond, ethylene, carbonyloxy or difluoromethyleneoxy, wherein at least one of $Z^1$, $Z^2$ and $Z^3$ is difluoromethyleneoxy; $Z^4$ and $Z^5$ are each independently a single bond, ethylene or carbonyloxy; $X^1$, $X^2$, $X^3$, $X^4$, $X^5$, $X^6$, $X^7$ and $X^8$ are each independently hydrogen or fluorine; $Y^1$ is fluorine, chlorine or trifluoromethoxy; and m is 0 or 1.

2. The liquid crystal composition according to claim 1, wherein the first component is at least one compound selected from the group of compounds represented by formulas (1-1) to (1-3):

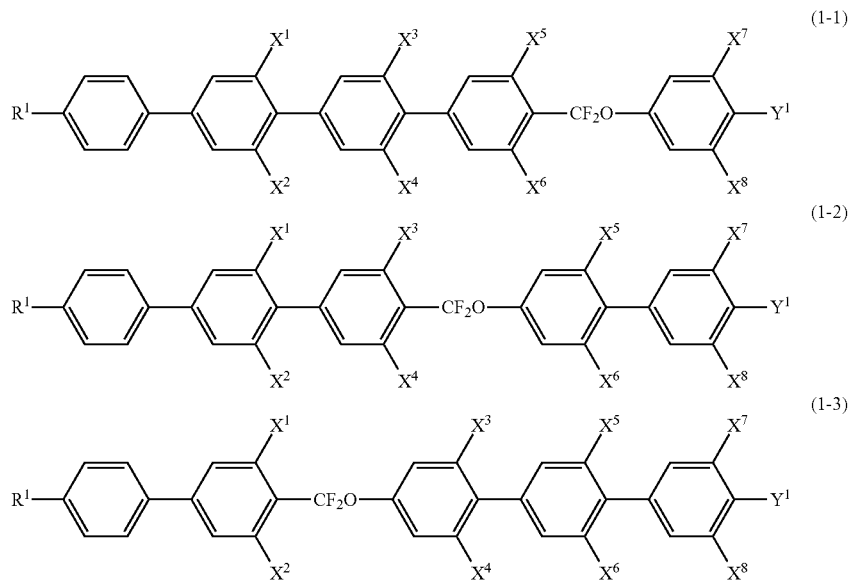

wherein R¹ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$ and $X^8$ are each independently hydrogen or fluorine; and $Y^1$ is fluorine, chlorine or trifluoromethoxy.

3. The liquid crystal composition according to claim 2, wherein the first component is at least one compound selected from the group of compounds represented by formula (1-1).

4. The liquid crystal composition according to claim 1, wherein the second component is at least one compound selected from the group of compounds represented by formulas (2-1) to (2-6):

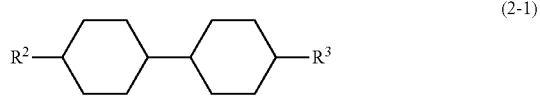

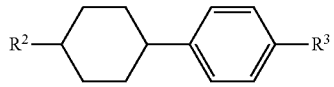

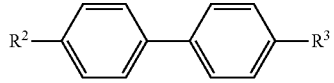

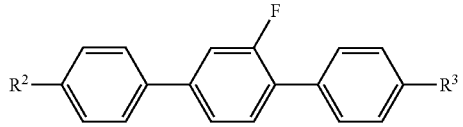

wherein R² and R³ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine.

5. The liquid crystal composition according to claim 4, wherein the second component is at least one compound selected from the group of compounds represented by formula (2-1).

6. The liquid crystal composition according to claim 4, wherein the second component is at least one compound selected from the group of compounds represented by formula (2-6).

7. The liquid crystal composition according to claim 4, wherein the second component is a mixture of at least one compound selected from the group of compounds represented by formula (2-1), and at least one compound selected from the group of compounds represented by formula (2-4).

8. The liquid crystal composition according to claim 4, wherein the second component is a mixture of at least one compound selected from the group of compounds represented by formula (2-1), and at least one compound selected from the group of compounds represented by formula (2-6).

9. The liquid crystal composition according to claim 1, wherein the ratio of the first component is in the range of 5% to 30% by weight, and the ratio of the second component is in the range of 35% to 80% by weight, based on the total weight of the liquid crystal composition.

10. The liquid crystal composition according to claim 1 that further comprises at least one compound selected from the group of compounds represented by formula (3) as a third component:

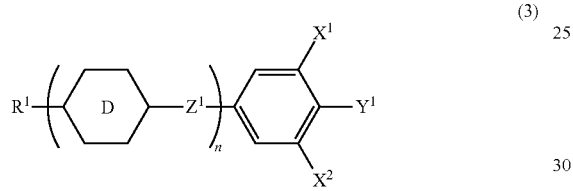
(3)

wherein $R^1$ is alkyl having 1 to 12 carbons, alkoxy having 1 to 12 carbons or alkenyl having 2 to 12 carbons; ring D is independently 1,4-cyclohexylene, 1,3-dioxane-2,5-diyl, 1,4-phenylene, 3-fluoro-1,4-phenylene, 3,5-difluoro-1,4-phenylene or 2,5-pyrimidine; $Z^1$ is a single bond, ethylene, carbonyloxy or difluoromethyleneoxy; $X^1$ and $X^2$ are each independently hydrogen or fluorine; $Y^1$ is fluorine, chlorine or trifluoromethoxy; and n is 1, 2 or 3.

11. The liquid crystal composition according to claim 10, wherein the third component is at least one compound selected from the group of compounds represented by formulas (3-1) to (3-17):

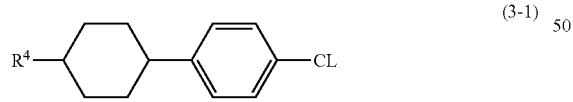
(3-1)

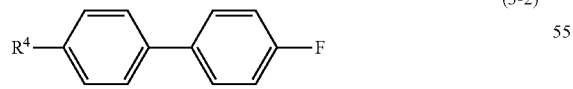
(3-2)

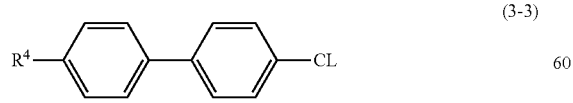
(3-3)

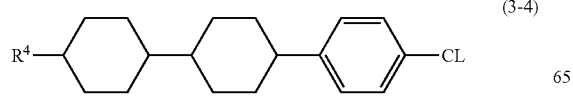
(3-4)

-continued

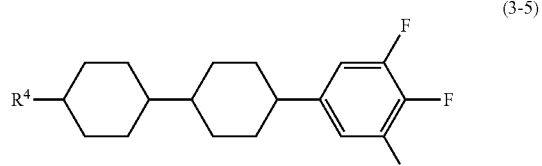
(3-5)

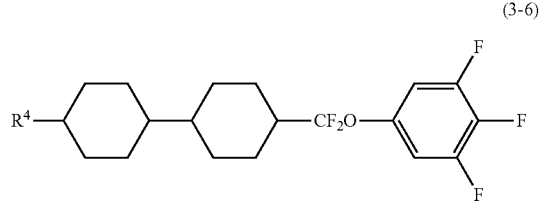
(3-6)

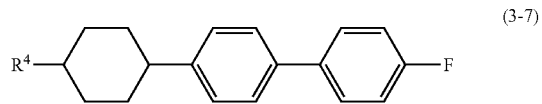
(3-7)

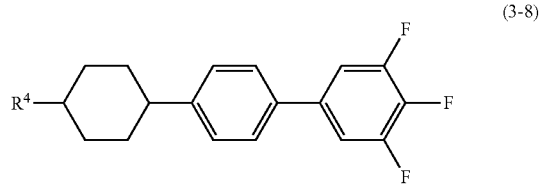
(3-8)

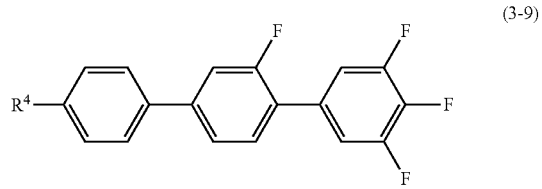
(3-9)

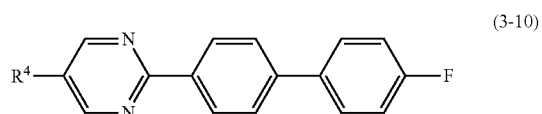
(3-10)

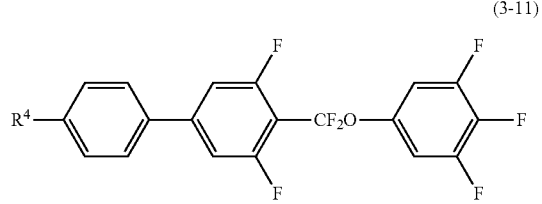
(3-11)

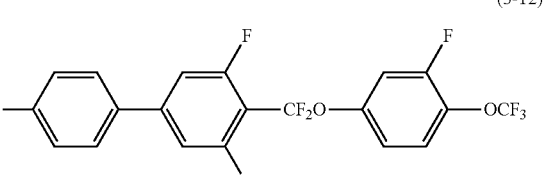
(3-12)

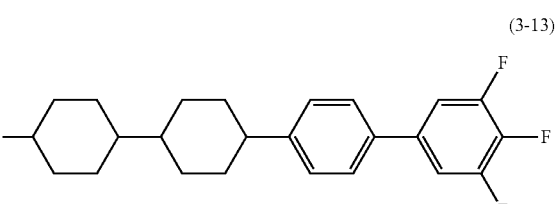
(3-13)

-continued (3-14)
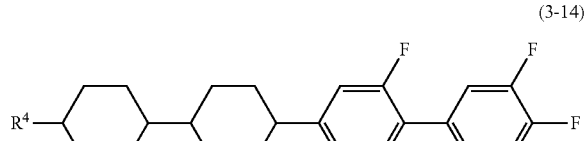

(3-15)
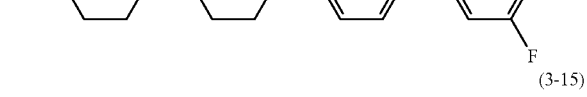

(3-16)
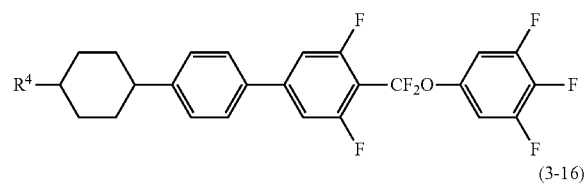

(3-17)
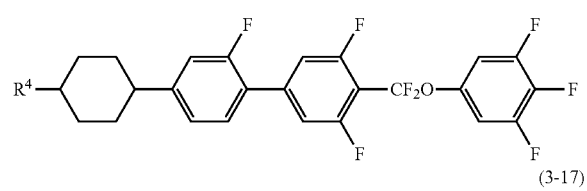

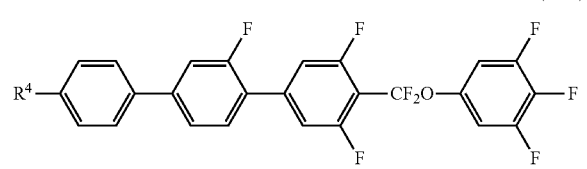

wherein $R^4$ is alkyl having 1 to 12 carbons or alkenyl having 2 to 12 carbons.

12. The liquid crystal composition according to claim 11, wherein the third component is at least one compound selected from the group of compounds represented by formula (3-9).

13. The liquid crystal composition according to claim 11, wherein the third component is at least one compound selected from the group of compounds represented by formula (3-11).

14. The liquid crystal composition according to claim 11, wherein the third component is at least one compound selected from the group of compounds represented by formula (3-17).

15. The liquid crystal composition according to claim 11, wherein the third component is a mixture of at least one compound selected from the group of compounds represented by formula (3-6), and at least one compound selected from the group of compounds represented by formula (3-11).

16. The liquid crystal composition according to claim 10, wherein the ratio of the third component is in the range of 5% to 50% by weight based on the total weight of the liquid composition.

17. The liquid crystal composition according to claim 1, wherein the composition has a maximum temperature of a nematic phase of 70° C. or more, an optical anisotropy (25° C.) of 0.08 or more at a wavelength of 589 nm, and a dielectric anisotropy (25° C.) of 2 or more at a frequency of 1 kHz.

18. A liquid crystal display device that comprises the liquid crystal composition according to claim 1.

19. A liquid crystal display device according to claim 18, wherein an operating mode of the liquid crystal display device is a TN mode, an OCB mode or an IPS mode, and a driving mode of the liquid crystal display device is an active matrix mode.

20. A liquid crystal display device according to claim 18, wherein an operating mode of the liquid crystal display device is a PSA mode and a driving mode of the liquid crystal display device is an active matrix mode.

* * * * *